United States Patent
Yu et al.

(10) Patent No.: US 9,822,703 B2
(45) Date of Patent: Nov. 21, 2017

(54) FUEL SUPPLY SYSTEM

(71) Applicant: General Electric Company, Schenectady, NY (US)

(72) Inventors: Ping Yu, ShangHai (CN); Wenjie Wu, ShangHai (CN); Zhiyong Chen, ShangHai (CN)

(73) Assignee: General Electric Company, Schenectady, NY (US)

(*) Notice: Subject to any disclaimer, the term of this patent is extended or adjusted under 35 U.S.C. 154(b) by 951 days.

(21) Appl. No.: 13/772,249

(22) Filed: Feb. 20, 2013

(65) Prior Publication Data
US 2013/0255271 A1 Oct. 3, 2013

(30) Foreign Application Priority Data
Mar. 30, 2012 (CN) .................... 2012 2 0240297 U (51) Int. Cl.
| | | |
|---|---|---|
| F02C 3/22 | (2006.01) | |
| F02C 7/14 | (2006.01) | |
| F02C 7/22 | (2006.01) | |
| F02C 9/26 | (2006.01) | |

(52) U.S. Cl.
CPC .................. *F02C 3/22* (2013.01); *F02C 7/14* (2013.01); *F02C 7/22* (2013.01); *F02C 9/26* (2013.01); *Y02E 20/16* (2013.01)

(58) Field of Classification Search
CPC ...... F02C 3/22; F02C 7/14; F02C 7/22; F02C 9/26; Y02E 20/16
See application file for complete search history.

(56) References Cited

U.S. PATENT DOCUMENTS

| | | | | |
|---|---|---|---|---|
| 2,977,756 A | * | 4/1961 | Stone ........................ | F02C 7/22 60/39.281 |
| 4,285,917 A | * | 8/1981 | Knight ................. | B01D 53/002 423/220 |
| 5,708,201 A | * | 1/1998 | Kaub .................... | F02D 33/003 340/439 |
| 6,004,095 A | * | 12/1999 | Waitz .................... | B64C 21/025 415/115 |
| 6,014,855 A | * | 1/2000 | Page ........................ | F02C 7/14 60/730 |
| 8,127,548 B2 | * | 3/2012 | Anson ...................... | F02C 7/236 60/39.281 |
| 2007/0221173 A1 | * | 9/2007 | Hazama ................ | F02D 33/006 123/458 |
| 2010/0037867 A1 | * | 2/2010 | Kleckler ................. | F02C 7/236 123/510 |

* cited by examiner

*Primary Examiner* — Brandon Lee
(74) *Attorney, Agent, or Firm* — Fletcher Yoder PC (57) ABSTRACT

A fuel supply system is provided having a first fuel gas compressor configured to be driven by a motor and a second fuel gas compressor configured to be driven by a shaft of a gas turbine system. The first fuel gas compressor and the second fuel gas compressor are configured to supply a pressurized fuel flow to a combustor of the gas turbine system, and the first fuel gas compressor and the second fuel gas compressor are coupled to one another in series.

16 Claims, 6 Drawing Sheets

FUEL SUPPLY SYSTEM

CROSS-REFERENCE TO RELATED APPLICATION

This application claims priority to and benefit of Chinese Patent Application No. 201220240297.5, entitled "FUEL SUPPLY SYSTEM", filed Mar. 30, 2012, which is herein incorporated by reference in its entirety.

BACKGROUND OF THE INVENTION

The subject matter disclosed herein relates to power generation systems, and, more particularly, to a fuel gas compressor system.

Syngas fuel, including blast furnace gas and coke oven gas, is widely used for generation power plants with gas turbines systems. For example, the gas turbine system may include one or more combustors, which may combust the fuel to produce hot combustion gases. The resulting hot combustion gases may then be used to drive one or more turbines. Generally, the fuel (e.g., blast furnace gas) supplied to the combustor of the gas turbine system must be supplied at an elevated pressure.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel supply system having a first fuel gas compressor configured to be driven by a motor and a second fuel gas compressor configured to be driven by a shaft of a gas turbine system. The first fuel gas compressor and the second fuel gas compressor are configured to supply a pressurized fuel flow to a combustor of the gas turbine system, and the first fuel gas compressor and the second fuel gas compressor are fluidly coupled to one another in series.

In a second embodiment, a system includes a controller configured to control a multi-stage compression of a fuel gas for a gas turbine system, wherein the controller is configured to control a first compressor driven by a motor and a second compressor driven by the gas turbine system to sequentially compress the fuel gas.

In a third embodiment, a method includes pressurizing a fuel flow with a first fuel gas compressor driven by a motor, supplying the fuel flow to a combustor of a gas turbine system, initiating operation of the gas turbine system, pressurizing the fuel flow with a second fuel gas compressor driven by a shaft of the gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed towards a fuel supply system for a gas turbine system, which may be used in a power generation system, such as a combined cycle power generation system or a blast furnace gas generation power plant. More specifically, the fuel supply system contains a motor driven fuel gas compressor and a main shaft driven fuel gas compressor, where the motor driven fuel gas compressor and the main shaft driven fuel gas compressor are serially connected. In other words, the fuel supply system includes a first fuel gas compressor that is driven by a stand-alone motor (e.g., an electric motor) separate from the gas turbine system, which is serially connected to (e.g., in fluid connection with) a second fuel gas compressor that is driven by the main shaft of the gas turbine system (e.g., the shaft driven by a turbine of the gas turbine system). The main shaft driven fuel gas compressor and the motor driven fuel gas compressor are each configured to compress a fuel, such as blast furnace gas, to be supplied to a combustor of the gas turbine system.

As mentioned above, the fuel (e.g., blast furnace gas) supplied to the combustor of the gas turbine system may be supplied at an elevated pressure. When starting up or initiating operation of the gas turbine system, the main shaft driven fuel gas compressor (e.g., a single stage or a multi stage fuel gas compressor) may not feed fuel (e.g., blast furnace gas) to the combustor at a sufficiently elevated pressure, because the main shaft of the gas turbine system may be rotating at a low speed or not rotating at all. As a result, the motor driven fuel gas compressor may be operated to supply the fuel (e.g., blast furnace gas) at an elevated pressure with its individual high rotation speed. Once the operation of the gas turbine system is initiated, the main shaft of the gas turbine system may rotate the main shaft driven fuel gas compressor to supplement the motor driven fuel gas compressor. Thus, the motor driven fuel gas compressor and the main shaft driven fuel gas compressor, which are serially connected (e.g., in fluid communication with one another), may work together to provide fuel (e.g., blast furnace gas) at an elevated pressure to the combustor of the gas turbine system.

Figure 1:
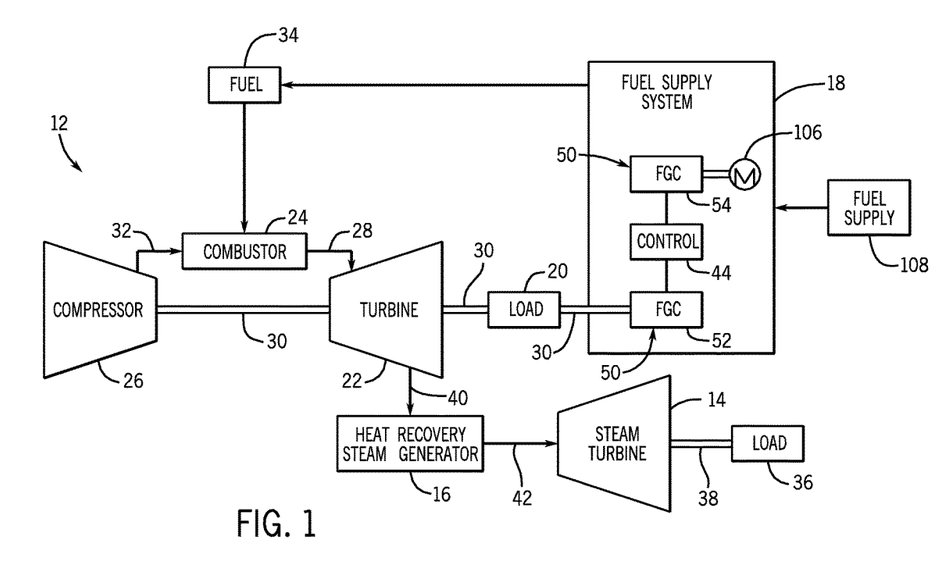
FIG. 1 is a schematic of an embodiment of a combined cycle power generation system having a gas turbine system, a steam turbine, a heat recovery steam generation (HRSG) system, and a fuel supply system.

Turning now to the drawings, FIG. 1 is a schematic flow diagram of an embodiment of a combined cycle power generation system 10 having a gas turbine system 12, a steam turbine 14, a heat recovery steam generation (HRSG) system 16, and a fuel supply system 18. As described in greater detail below, the fuel supply system may include a main shaft driven fuel gas compressor and a motor driven fuel gas compressor configured to supply a fuel (e.g., blast furnace gas) to the gas turbine system 12. Additionally, the main shaft driven fuel gas compressor and the motor driven fuel gas compressor may be serially connected (e.g., fluidly connected to compress the fuel gas in stages). That is, the main shaft driven fuel gas compressor and the motor driven fuel gas compressor may be configured to flow the same fuel flow from a fuel supply.

In the illustrated embodiment, the gas turbine system 12 is configured to drive a first load 20. The first load 20 may be, for instance, an electrical generator for producing electrical power. The gas turbine system 12 includes a turbine 22, a combustor 24, and a compressor 26. The combustor 24 ignites an air-fuel mixture, and then passes hot pressurized combustion gases 28 (e.g., exhaust) into the turbine 22. Turbine blades are coupled to a shaft 30, which is also coupled to several other components throughout the gas turbine system 12. As the combustion gasses 28 pass through the turbine blades in the turbine 22, the turbine 22 is driven into rotation, which causes the shaft 30 to rotate. Eventually, the combustion gasses 20 exit the turbine 22 in the form of exhaust, as described below. As shown, the shaft 30 is coupled to the load 20, which is powered via rotation of the shaft 30.

Compressor blades are included as components of the compressor 26. The blades within the compressor 26 are coupled to the shaft 30, and will rotate as the shaft 30 is driven to rotate by the turbine 22, as described above. The rotation of the blades within the compressor 26 compresses air from an air intake into pressurized air 32. The pressurized air 32 is then fed into the combustor 24, where the pressurized air 32 is mixed with fuel 34 (e.g., blast furnace gas) supplied by the fuel supply system 18.

The system 10 also includes the steam turbine 14 for driving a second load 36 (e.g., via rotation of a shaft 38). The second load 36 may also be an electrical generator for generating electrical power. However, both the first and second loads 20 and 36 may be other types of loads capable of being driven by the gas turbine system 12 and the steam turbine 14. In addition, although the gas turbine system 12 and the steam turbine 14 drive separate loads (e.g., first and second loads 20 and 36) in the illustrated embodiment, the gas turbine system 12 and steam turbine 14 may also be utilized in tandem to drive a single load via a single shaft.

The system 10 further includes the HRSG system 16. Heated exhaust gas 40 from the turbine 22 is transported into the HRSG system 16 to heat water to produce steam 42 used to power the steam turbine 14. As will be appreciated, the HRSG system 16 may include various economizers, condensers, evaporators, heaters, and so forth, to generate and heat the steam 42 used to power the steam turbine 14. The steam 42 produced by the HRSG system 16 passes through turbine blades of the steam turbine 14. As the steam 42 pass through the turbine blades in the steam turbine 14, the steam turbine 14 is driven into rotation, which causes the shaft 38 to rotate, thereby powering the second load 36.

As mentioned above, the system 10 includes the fuel supply system 18, which supplies the fuel 34 (e.g., blast furnace gas) to the combustor 24 of the gas turbine system 12. Specifically, the fuel supply system 18 may include two or more serially connected fuel gas compressors 50 configured to pass the fuel 34 to the combustor 24. In other words, the two or more fuel gas compressors 50 may be fluidly coupled in series with one another, thereby enabling the fuel gas compressors 50 to work together to compress and deliver the fuel 34 from a fuel supply 108 (e.g., a blast furnace) to the combustor 24. For example, the fuel supply system 18 may include a first fuel gas compressor 52 coupled to and driven by the shaft 30 driven by the turbine 22. Additionally, the fuel supply system 18 may include a second fuel gas compressor 54 coupled to and driven by a motor 106 (e.g., an electric motor, combustion engine, etc.) separate from the turbine 22 (e.g., not driven by the shaft 30). In this manner, the second fuel gas compressor 54 may supply the pressurized fuel 34 to the combustor 24 during a startup sequence of the gas turbine system 12 when the shaft 30 is not rotating or is rotating at slow speeds causing the first fuel gas compressor 52 to have a limited flow and/or compression capacity. Once the gas turbine system 12 is running at a higher speed (e.g., an operational speed), the fuel gas compressors 50 may work together to provide adequately pressurized fuel 34 to the combustor 24.

As discussed in detail below, the fuel gas compressors 50 may have various pressure ratings and/or flow capacities. For example, the first fuel gas compressor 52 of the fuel supply system 18 may be a high pressure fuel gas compressor and the second fuel gas compressor 54 may be a low pressure fuel gas compressor. Additionally, different embodiments of the fuel supply system 18 may have different numbers (e.g., 2, 3, 4, 5, 6, 7, 8, 9, 10, or more) of fuel gas compressors 50. For example, the fuel supply system 18 may have two fuel gas compressors 50 (e.g., a two stage system) or three fuel gas compressors 50 (e.g., a three stage system). Other embodiments of the fuel supply system 18 may have more (e.g., 4 or more) fuel gas compressors 50. Furthermore, the fuel supply system 18 may include a controller 44 (e.g., an electronic control unit) configured to regulate the operation of various components of the fuel supply system 18. For example, the controller 44 may regulate the operation of motors 106, fuel gas compressors 50, valves, etc. For example, the controller 44 may control only one fuel gas compressor 50, or multiple fuel gas compressors 50. Similarly, the controller 44 may control a transition of operation between fuel gas compressors 50 (e.g., a gradual shift from the operation of one fuel gas compressor 50 to another). Additionally, the controller 44 may be configured to receive feedback from the various components of the fuel supply system 18.

Figure 2:
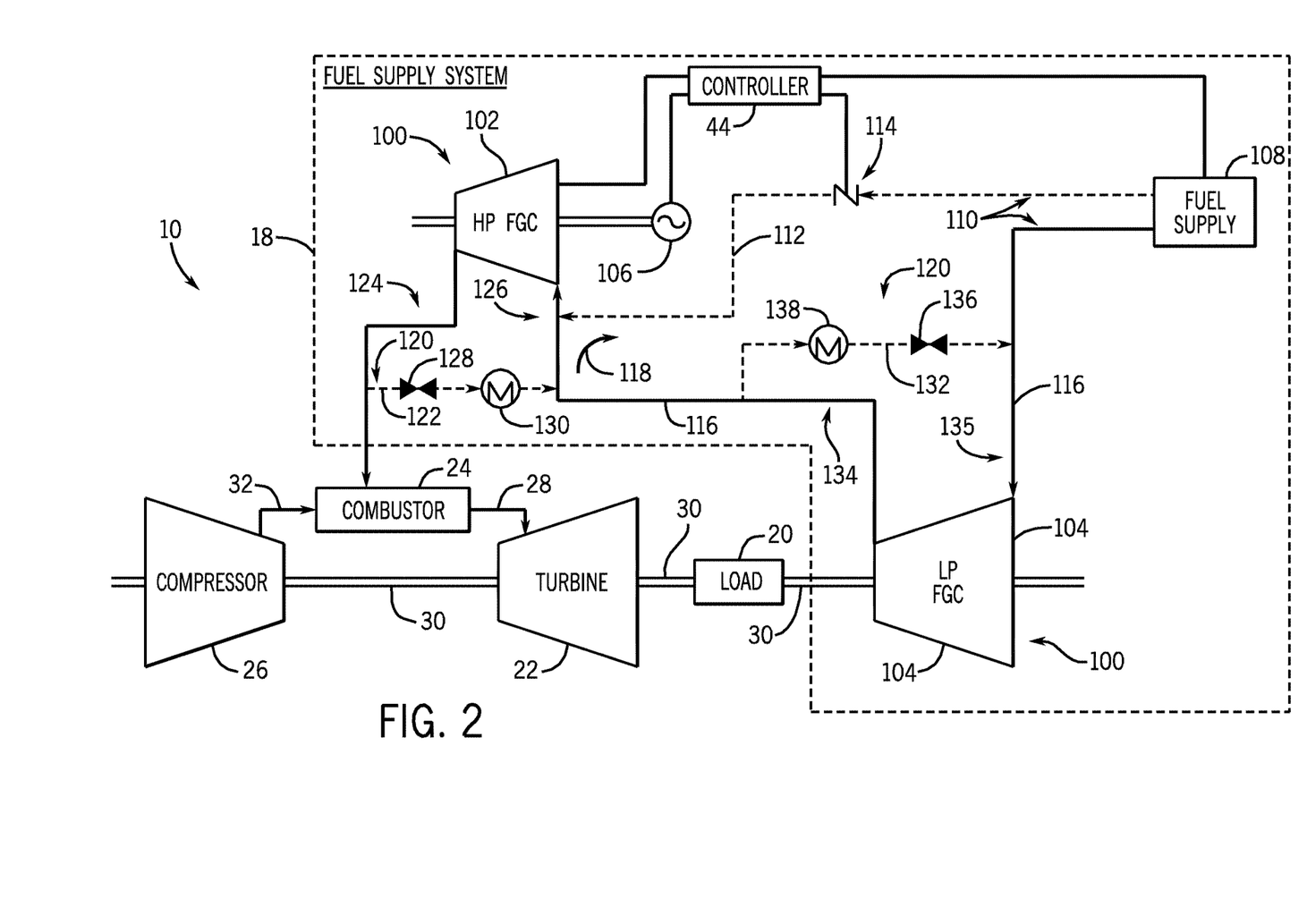
FIG. 2 is a schematic of an embodiment of the gas turbine system and the fuel supply system.

FIG. 2 is a partial schematic of an embodiment of the combined cycle power generation system 10, illustrating the fuel supply system 18 having two fuel gas compressors 100. In other words, the fuel supply system 18 is a two-stage system. For example, the fuel supply system 18 has a high pressure fuel gas compressor 102 and a low pressure fuel gas compressor 104.

In the illustrated embodiment, the high pressure fuel gas compressor 102 is driven by a stand-alone motor 106 (e.g., an electric motor or other type of motor), and the low pressure fuel gas compressor 104 is driven by the shaft 30 of the gas turbine system 12. As mentioned above, the fuel 34 is supplied to the combustor 24 at an elevated pressure. When the gas turbine system 12 is powered off, the motor 106 may be used to operate (e.g., rotate) the high pressure fuel gas compressor 102. In this way, the fuel 34 may be pressurized and supplied to the combustor 24 to prepare the gas turbine system 12 for operation. Specifically, the high pressure fuel gas compressor 102 may draw the fuel 34 from a fuel supply 108. For example, in the illustrated embodiment, the fuel 34 passes to the high pressure fuel gas compressor 102 through two conduits 110 (e.g., parallel conduits). As shown, a first conduit 112 passes from the fuel supply 108 to the high pressure fuel gas compressor 102 and includes a check valve 114. A second conduit 116 passes from the fuel supply 108, through the low pressure fuel gas compressor 104, and to the high pressure fuel gas compressor 102. Prior to the gas turbine system 12 starting up, the high pressure fuel gas compressor 102, powered by the motor 106, boosts the fuel 34 to the desired elevated pressure and sends the fuel 34 to the combustor 24. As will be appreciated, prior to or during startup of the gas turbine system 12 starting up, the low pressure fuel gas compressor 104 coupled to the shaft 30 may be operating at low speed and may have limited flow and/or compression capacity because the shaft 30 may be rotating at low speeds or not at all.

As the combustor 24 receives the pressurized fuel 34 from the high pressure fuel gas compressor 102 powered by the motor 106, the combustor 24 may begin combusting the fuel 34, and the gas turbine system 12 may begin operation. As the gas turbine system 12 operates, the turbine 22 rotates the shaft 30, thereby driving the low pressure fuel gas compressor 104 and pressurizing the fuel 34. That is, the low pressure fuel gas compressor 104 compresses the fuel 34 flowing from the fuel supply 108 through the second conduit 116. From the low pressure fuel gas compressor 104, the pressurized fuel 34 passes to the high pressure fuel gas compressor 102 through the second conduit 116, and to the combustor 24 thereafter. Additionally, as the low pressure fuel gas compressor 104 passes the pressurized fuel 34 to the high pressure fuel gas compressor 102, the discharge pressure (e.g., represented by arrow 118) of the low pressure fuel gas compressor 104 may close the check valve 114 in the first conduit 112. Once the check valve 114 is closed, the high pressure fuel gas compressor 102 may further compress only the fuel 34 received from the low pressure fuel gas compressor 104 and then pass the fuel 34 to the combustor 24. In other words, the high pressure fuel gas compressor 102 may no longer receive fuel 34 directly from the fuel supply 108 through the first conduit 112 when the check valve 114 is closed.

As shown, the fuel supply system 18 also includes a number of recirculation conduits 120. For example, a high pressure fuel gas compressor recirculation conduit 122 passes from an outlet 124 of the high pressure fuel gas compressor 102 to an inlet 126 of the high pressure fuel gas compressor 102. The recirculation conduit 122 includes a bypass valve 128. As will be appreciated, the bypass valve 128 may be configured to open when a pressure of the fuel 34 exiting the high pressure fuel gas compressor 102 exceeds a threshold. In this manner, the recirculation conduit 122 may serve an anti-surge function by regulating the pressure of the fuel 34 passing to the combustor 24 from the high pressure fuel gas compressor 102. Additionally, the recirculation conduit 122 includes a cooler 130 (e.g., a high pressure cooler), which may be configured to cool the fuel 34 passing through the recirculation conduit 122. As will be appreciated, the high pressure fuel gas compressor 102 may have improved operation when the temperature of the fuel 34 is decreased.

Additionally, the fuel supply system 18 also includes a low pressure fuel gas compressor recirculation conduit 132 which passes from an outlet 134 of the low pressure fuel gas compressor 104 to an inlet 135 of the low pressure fuel gas compressor 104. As similarly described above, the recirculation conduit 132 includes a bypass valve 136 and a cooler 138 (e.g., a low pressure cooler). The cooler 138 is configured to cool the fuel 34 passing through the recirculation conduit 132, and the bypass valve 136 is configured to open when a pressure of the fuel 34 exiting the low pressure fuel gas compressor 102 exceeds a threshold. In this manner, the recirculation conduit 132 may serve an anti-surge function by regulating the pressure of the fuel 34 passing to the high pressure fuel gas compressor 102 from the low pressure fuel gas compressor 104.

As mentioned above, the fuel supply system 18 also includes the controller 44. The controller 44 may be configured to regulate the operation of various components of the fuel supply system 18. For example, the controller 44 may regulate the operation of the motor 106, the fuel gas compressors 100, the coolers 130 and 138, and so forth. Additionally, the controller 44 may be configured to receive feedback from various components of the fuel supply system 18. For example, the controller 44 may receive feedback regarding the operation of the check valve 114 and the bypass valves 128 and 136. Similarly, the controller 44 may receive feedback from the compressors 100 and/or the coolers 130. As will be appreciated, the feedback received by the controller 44 from various components of the fuel supply system 18 may be used to further regulate the operation of the various components of the fuel supply system 18.

Figure 3:
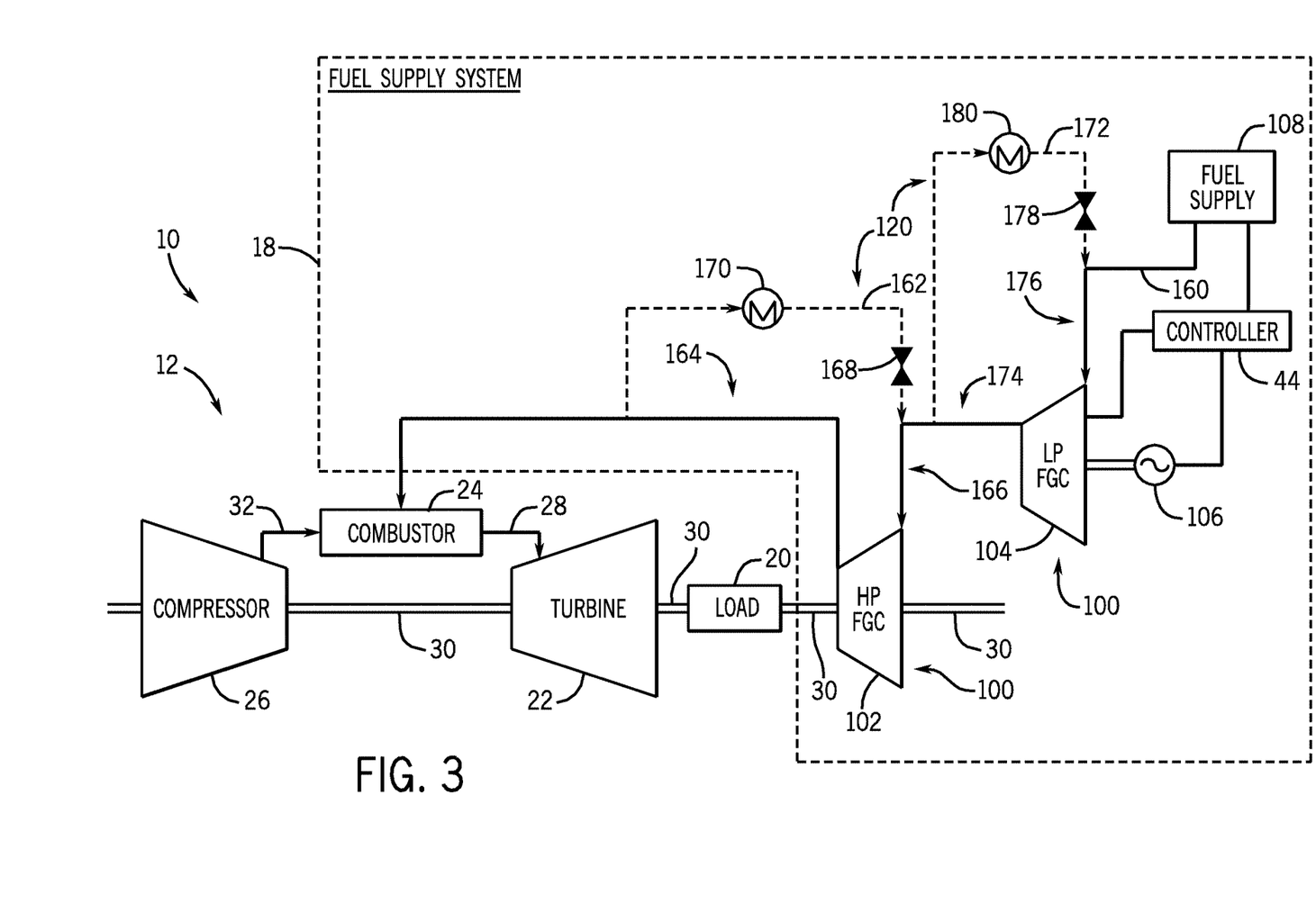
FIG. 3 is a schematic of an embodiment of the gas turbine system and the fuel supply system.

FIG. 3 is a partial schematic of an embodiment of the combined cycle power generation system 10, illustrating the fuel supply system 18 having two fuel gas compressors 100. In other words, the fuel supply system 18 is a two-stage system. The illustrated embodiment of the fuel supply system 18 is similar to the embodiment shown in FIG. 2, and includes similar elements and element numbers. However, in the illustrated embodiment, the high pressure fuel gas compressor 102 is driven by the shaft 30 of the gas turbine system 12, and the low pressure fuel gas compressor 104 is driven by the motor 106.

When the gas turbine system 12 is powered off or starting up, the motor 106 may be used to operate (e.g., rotate) the low pressure fuel gas compressor 104. In this way, the fuel 34 may be pressurized and supplied to the combustor 24 to prepare the gas turbine system 12 for operation. In other words, the motor 106 driven compressor 100, 102 is a stand-alone or dedicated compressor that does not rely on power from turbines 22, 14. The low pressure fuel gas compressor 104 draws the fuel 34 from the fuel supply 108. For example, in the illustrated embodiment, the fuel 34 passes to the low pressure fuel gas compressor 104 through a fuel supply inlet 160. Prior to the gas turbine system 12 starting up, the low pressure fuel gas compressor 104, powered by the motor 106, boosts the fuel 34 to the desired elevated pressure and sends the fuel 34 to the combustor 24 (e.g., through the high pressure fuel gas compressor 102, as shown). However, prior to or during startup of the gas turbine system 12 starting up, the high pressure fuel gas compressor 102 coupled to the shaft 30 may be operating at low speed and may have limited flow and/or compression capacity because the shaft 30 may be rotating at low speeds or not at all.

As the combustor 24 receives the pressurized fuel 34 from the low pressure fuel gas compressor 104 powered by the motor 106, the combustor 24 may begin combusting the fuel 34, and the gas turbine system 12 may begin operation. As the gas turbine system 12 operates, the turbine 22 rotates the shaft 30, thereby driving the high pressure fuel gas compressor 102 and further pressurizing the fuel 34. That is, the high pressure fuel gas compressor 102 further compresses the fuel 34 flowing from the low pressure fuel gas compressor 104, and subsequently flows the fuel 34 to the combustor 24.

As shown, the fuel supply system 18 also includes the recirculation conduits 120. For example, a high pressure fuel gas compressor recirculation conduit 162 passes from an outlet 164 of the high pressure fuel gas compressor 102 to an inlet 166 of the high pressure fuel gas compressor 102. The recirculation conduit 162 includes a bypass valve 168. As will be appreciated, the bypass valve 168 may be configured to open when a pressure of the fuel 34 exiting the high pressure fuel gas compressor 102 exceeds a threshold. In this manner, the recirculation conduit 162 may serve an anti-surge function by regulating the pressure of the fuel 34 passing to the combustor 24 from the high pressure fuel gas compressor 102. Additionally, the recirculation conduit 162 includes a cooler 170 (e.g., a high pressure cooler), which may be configured to cool the fuel 34 passing through the recirculation conduit 162. As will be appreciated, the high pressure fuel gas compressor 102 may have improved operation when the temperature of the fuel 34 is decreased.

Additionally, the fuel supply system 18 also includes a low pressure fuel gas compressor recirculation conduit 172 which passes from an outlet 174 of the low pressure fuel gas compressor 104 to an inlet 176 of the low pressure fuel gas compressor 104. As similarly described above, the recirculation conduit 172 includes a bypass valve 178 and a cooler 180 (e.g., a low pressure cooler). The cooler 180 is configured to cool the fuel 34 passing through the recirculation conduit 172, and the bypass valve 178 is configured to open when a pressure of the fuel 34 exiting the low pressure fuel gas compressor 104 exceeds a threshold. In this manner, the recirculation conduit 172 may serve an anti-surge function by regulating the pressure of the fuel 34 passing to the high pressure fuel gas compressor 102 from the low pressure fuel gas compressor 104.

Figure 4:
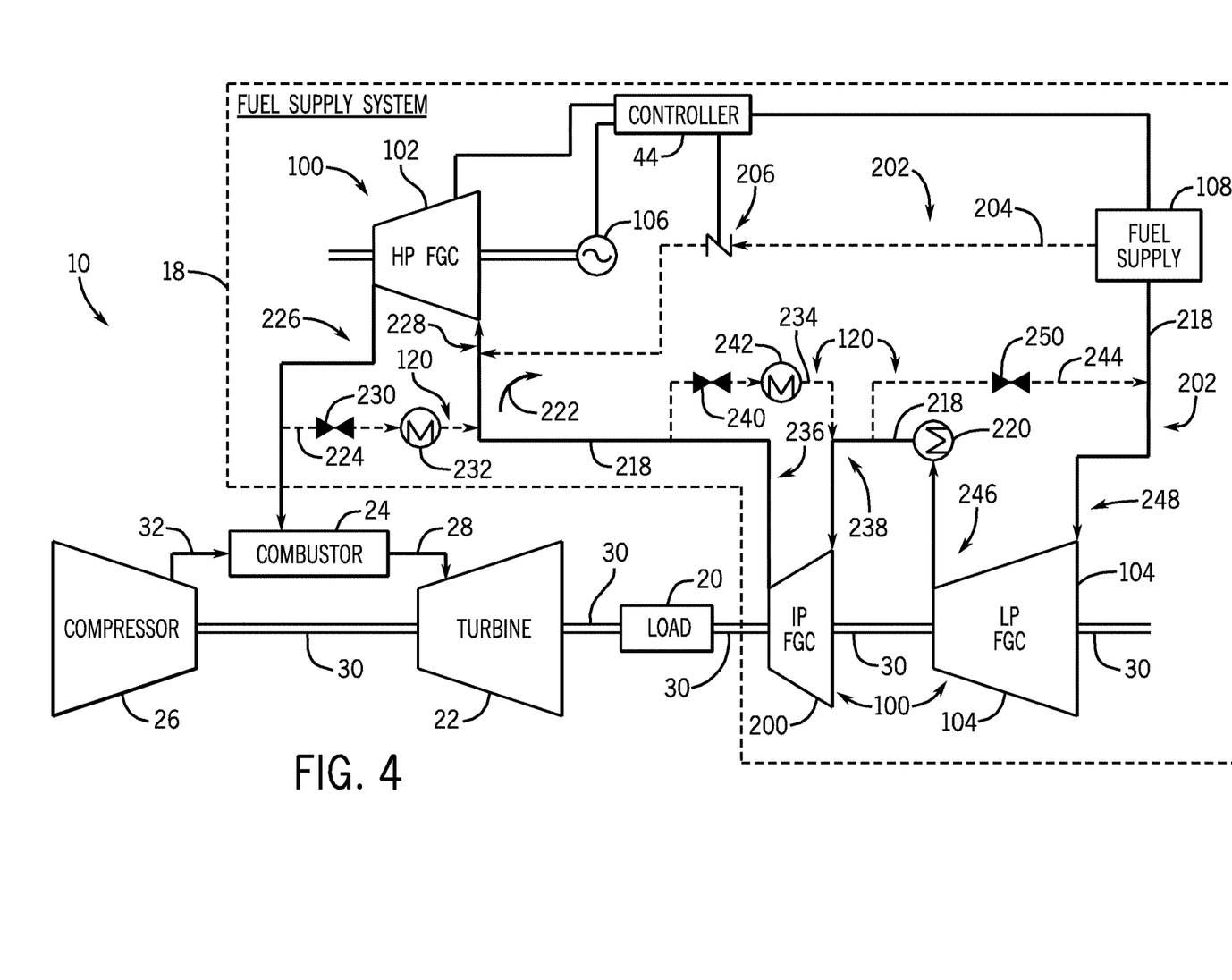
FIG. 4 is a schematic of an embodiment of the gas turbine system and the fuel supply system.

FIG. 4 is a partial schematic of an embodiment of the combined cycle power generation system 10, illustrating the fuel supply system 18 having three fuel gas compressors 100. In other words, the fuel supply system 18 is a three-stage system. The illustrated embodiment of the fuel supply system 18 is similar to the embodiment shown in FIG. 2, and includes similar elements and element numbers. Additionally, in the illustrated embodiment, the fuel supply system 18 includes an intermediate pressure fuel gas compressor 200. Furthermore, the high pressure fuel gas compressor 102 is driven by the motor 106, and the low pressure and intermediate pressure fuel gas compressors 104 and 200 are driven by the shaft 30 of the gas turbine system 12.

As mentioned above, the fuel 34 is supplied to the combustor 24 at an elevated pressure. When the gas turbine system 12 is powered off or starting up, the motor 106 may be used to operate (e.g., rotate) the high pressure fuel gas compressor 102. In this way, the fuel 34 may be pressurized and supplied to the combustor 24 to prepare and/or startup the gas turbine system 12 for steady state operation. In other words, the motor 106 driven compressor 100, 102, 200 is a stand-alone or dedicated compressor that does not rely on power from turbines 22, 14.

The high pressure fuel gas compressor 102 may draw the fuel 34 from the fuel supply 108. For example, in the illustrated embodiment, the fuel 34 passes to the high pressure fuel gas compressor 102 through two conduits 202 (e.g., parallel conduits). As shown, a first conduit 204 passes from the fuel supply 108 directly to the high pressure fuel gas compressor 102 and includes a check valve 206. A second conduit 218 passes from the fuel supply 108, through the low and intermediate pressure fuel gas compressors 104 and 200, and to the high pressure fuel gas compressor 102. Prior to or during startup of the gas turbine system 12, the high pressure fuel gas compressor 102, powered by the motor 106, boosts the fuel 34 to the desired elevated pressure and sends the fuel 34 to the combustor 24. As will be appreciated, prior to or during start up of the gas turbine system 12, the low and intermediate pressure fuel gas compressors 104 and 200 coupled to the shaft 30 may be operating at low speed and may have limited flow and/or compression capacities, because the shaft 30 may be rotating at low speeds or not at all.

As the combustor 24 receives the pressurized fuel 34 from the high pressure fuel gas compressor 102 powered by the motor 106, the combustor 24 may begin combusting the fuel 34, and the gas turbine system 12 may begin operation. As the gas turbine system 12 operates, the turbine 22 rotates the shaft 30, thereby driving the low and intermediate pressure fuel gas compressors 104 and 200 and further pressurizing the fuel 34. That is, the low and intermediate pressure fuel gas compressors 104 and 200 compress the fuel 34 (e.g., in first and second stages) flowing from the fuel supply 108 through the second conduit 218. Specifically, the fuel 34 flows through the second conduit 218 to the low pressure fuel gas compressor 104, where the fuel 34 is pressurized in a low pressure compression stage. From the low pressure fuel gas compressor 104, the pressurized fuel 34 passes to the intermediate pressure fuel gas compressor 200 (e.g., through the second conduit 218), where the fuel 34 is further pressurized in an intermediate pressure compression stage. Additionally, as the fuel 34 passes from the low pressure fuel gas compressor 104 to the intermediate pressure fuel gas compressor 200, the fuel 34 is cooled by a cooler 220 (e.g., a low pressure cooler) disposed along the second conduit 218 (e.g., between the low pressure fuel gas compressor 104 and the intermediate pressure fuel gas compressor 200). From the intermediate pressure fuel gas compressor 200, the fuel 34 passes through the second conduit 218 to the high pressure fuel gas compressor 102 for further pressurization in a high pressure compression stage, followed by delivery to the combustor 24.

Furthermore, as the intermediate pressure fuel gas compressor 200 passes the pressurized fuel 34 to the high pressure fuel gas compressor 102, the discharge pressure (e.g., represented by arrow 222) of the intermediate pressure fuel gas compressor 200 may close the check valve 206 in the first conduit 204. Once the check valve 206 is closed, the high pressure fuel gas compressor 102 may further compress only the fuel 34 received from the intermediate pressure fuel gas compressor 200 and then pass the fuel 34 to the combustor 24. In other words, the high pressure fuel gas compressor 102 may no longer receive fuel 34 directly from the fuel supply 108 through the first conduit 204 when the check valve 206 is closed.

Moreover, the fuel supply system 18 also includes the recirculation conduits 120. For example, a high pressure fuel gas compressor recirculation conduit 224 passes from an outlet 226 of the high pressure fuel gas compressor 102 to an inlet 228 of the high pressure fuel gas compressor 102. The recirculation conduit 224 includes a bypass valve 230. As will be appreciated, the bypass valve 230 may be configured to open when a pressure of the fuel 34 exiting the high pressure fuel gas compressor 102 exceeds a threshold. In this manner, the recirculation conduit 224 may serve an anti-surge function by regulating the pressure of the fuel 34 passing to the combustor 24 from the high pressure fuel gas compressor 102. Additionally, the recirculation conduit 224 includes a cooler 232 (e.g., a high pressure cooler), which may be configured to cool the fuel 34 passing through the recirculation conduit 224. As will be appreciated, the high pressure fuel gas compressor 102 may have improved operation when the temperature of the fuel 34 is decreased.

The fuel supply system 18 also includes an intermediate pressure fuel gas compressor recirculation conduit 234, which passes from an outlet 236 of the intermediate pressure fuel gas compressor 200 to an inlet 238 of the intermediate pressure fuel gas compressor 200. As similarly described above, the recirculation conduit 234 includes a bypass valve 240 and a cooler 242 (e.g., an intermediate pressure cooler). The cooler 242 is configured to cool the fuel 34 passing through the recirculation conduit 234, and the bypass valve 240 is configured to open when a pressure of the fuel 34 exiting the intermediate pressure fuel gas compressor 200 exceeds a threshold. In this manner, the recirculation conduit 234 may serve an anti-surge function by regulating the pressure of the fuel 34 passing to the high pressure fuel gas compressor 102 from the intermediate pressure fuel gas compressor 200.

Additionally, the fuel supply system 18 includes a low pressure fuel gas compressor recirculation conduit 244, which passes from an outlet 246 of the low pressure fuel gas compressor 104 to an inlet 248 of the low pressure fuel gas compressor 104. In the illustrated embodiment, the recirculation conduit 244 includes a bypass valve 250 configured to open when a pressure of the fuel 34 exiting the low pressure fuel gas compressor 103 exceeds a threshold. As will be appreciated, the recirculation conduit 244 may not include a cooler (e.g., the cooler 220), because the second conduit 218 extending between the low pressure fuel gas compressor 104 and the intermediate pressure fuel gas compressor 200 includes the cooler 220, and the fuel 34 may pass through the cooler 220, thereby cooling the fuel 34, before the fuel 34 passes through the recirculation conduit 244. However, in other embodiments, a cooler (e.g., cooler 220) may be disposed along the recirculation conduit 244 instead of, or in addition to, being disposed along the second conduit 218.

Figure 5:
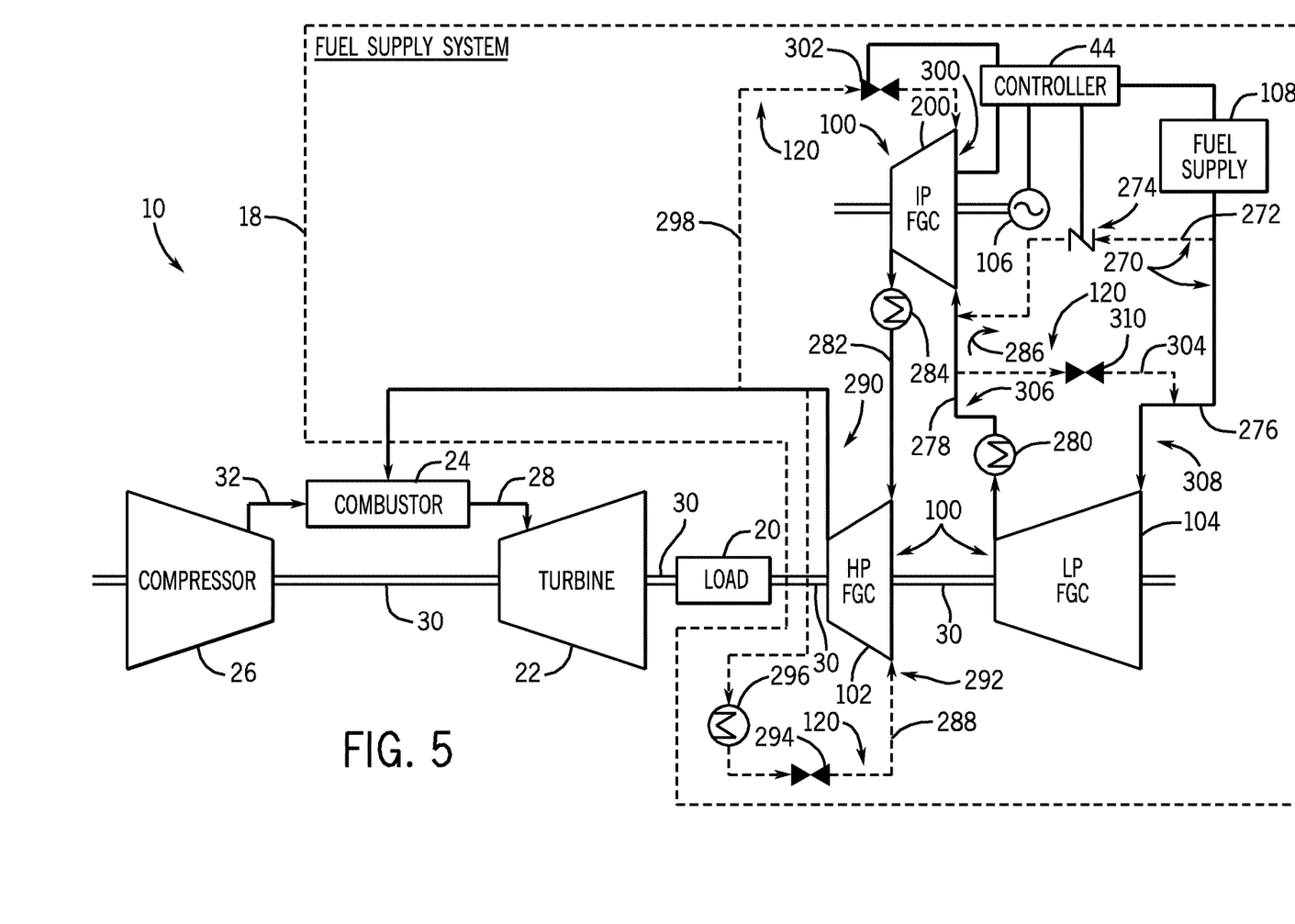
FIG. 5 is a schematic of an embodiment of the gas turbine system and the fuel supply system.

FIG. 5 is a partial schematic of an embodiment of the combined cycle power generation system 10, illustrating the fuel supply system 18 having three fuel gas compressors 100. In other words, the fuel supply system 18 is a three-stage system. The illustrated embodiment of the fuel supply system 18 is similar to the embodiment shown in FIG. 4, and includes similar elements and element numbers. However, in the illustrated embodiment, the intermediate pressure fuel gas compressor 200 is driven by the motor 106, and the high pressure and low pressure fuel gas compressors 102 and 104 are driven by the shaft 30 of the gas turbine system 12.

As mentioned above, the fuel 34 is supplied to the combustor 24 at an elevated pressure. When the gas turbine system 12 is powered off or starting up, the motor 106 may be used to operate (e.g., rotate) the intermediate pressure fuel gas compressor 200. In this way, the fuel 34 may be pressurized and supplied to the combustor 24 to prepare and/or startup the gas turbine system 12 for steady state operation. In other words, the motor 106 driven compressor 100, 102, 200 is a stand-alone or dedicated compressor that does not rely on power from turbines 22, 14.

As shown, the intermediate pressure fuel gas compressor 200 may draw the fuel 34 from the fuel supply 108. For example, in the illustrated embodiment, the fuel 34 passes to the high pressure fuel gas compressor 102 through two conduits 270 (e.g., parallel conduits). As shown, a first conduit 272 passes from the fuel supply 108 directly to the intermediate pressure fuel gas compressor 200 and includes a check valve 274. A second conduit 276 passes from the fuel supply 108, through the low pressure fuel gas compressor 104, and to the intermediate pressure fuel gas compressor 200. Prior to or during start up of the gas turbine system 12, the intermediate pressure fuel gas compressor 200, powered by the motor 106, boosts the fuel 34 to the desired elevated pressure and sends the fuel 34 through the high pressure fuel gas compressor 102 and to the combustor 24. As will be appreciated, prior to or during startup of the gas turbine system 12, the high and low pressure fuel gas compressors 102 and 104 coupled to the shaft 30 may be operating at low speeds and may have limited flow and/or compression capacities, because the shaft 30 may be rotating at low speeds or not at all.

As the combustor 24 receives the pressurized fuel 34 from the intermediate pressure fuel gas compressor 200 powered by the motor 106, the combustor 24 may begin combusting the fuel 34, and the gas turbine system 12 may begin operation. As the gas turbine system 12 operates, the turbine 22 rotates the shaft 30, thereby driving the high and low pressure fuel gas compressors 102 and 104 and pressurizing the fuel 34. That is, the low pressure fuel gas compressor 104 compresses the fuel 34 flowing from the fuel supply 108 through the second conduit 276 in a low pressure compression stage, and the high pressure fuel gas compressor 102 compresses the fuel 34 flowing from the intermediate pressure fuel gas compressor 200 in a high pressure compression stage. More specifically, the fuel 34 flows through the second conduit 276 to the low pressure fuel gas compressor 104, where the fuel 34 is pressurized in a low pressure compression stage. From the low pressure fuel gas compressor 104, the pressurized fuel 34 passes to the intermediate pressure fuel gas compressor 200 (e.g., through a third conduit 278), where the fuel 34 is further pressurized in an intermediate pressure compression stage. Additionally, as the fuel 34 passes from the low pressure fuel gas compressor 104 to the intermediate pressure fuel gas compressor 200, the fuel 34 is cooled by a cooler 280 (e.g., a low pressure cooler) disposed along the third conduit 278 (e.g., between the low pressure fuel gas compressor 104 and the intermediate pressure fuel gas compressor 200). From the intermediate pressure fuel gas compressor 200, the fuel 34 passes through a fourth conduit 282 to the high pressure fuel gas compressor 102. As shown, the fourth conduit 282 includes a cooler 284 (e.g., an intermediate pressure cooler), which may further cool the fuel 34 passing to the high pressure fuel gas compressor 102. After the fuel 34 is further pressurized within the high pressure fuel gas compressor 102 in a high pressure compression stage, the fuel 34 is supplied to the combustor 24.

Furthermore, as the low pressure fuel gas compressor 104 passes the pressurized fuel 34 to the intermediate pressure fuel gas compressor 200, the discharge pressure (e.g., represented by arrow 286) of the low pressure fuel gas compressor 104 may close the check valve 274 in the first conduit 272. Once the check valve 274 is closed, the intermediate pressure fuel gas compressor 200 may further compress only the fuel 34 received from the low pressure fuel gas compressor 104 and then pass the fuel 34 to the high pressure fuel gas compressor 102. In other words, the intermediate pressure fuel gas compressor 200 may no longer receive fuel 34 directly from the fuel supply 108 through the first conduit 272 when the check valve 274 is closed.

Moreover, the fuel supply system 18 also includes the recirculation conduits 120. For example, a high pressure fuel gas compressor recirculation conduit 288 passes from an outlet 290 of the high pressure fuel gas compressor 102 to an inlet 292 of the high pressure fuel gas compressor 102. The recirculation conduit 288 also includes a bypass valve 294. As will be appreciated, the bypass valve 294 may be configured to open when a pressure of the fuel 34 exiting the high pressure fuel gas compressor 102 exceeds a threshold. In this manner, the recirculation conduit 288 may serve an anti-surge function by regulating the pressure of the fuel 34 passing to the combustor 24 from the high pressure fuel gas compressor 102. Additionally, the recirculation conduit 288 includes a cooler 296 (e.g., a high pressure cooler), which may be configured to cool the fuel 34 passing through the recirculation conduit 288. As will be appreciated, the high pressure fuel gas compressor 102 may have improved operation when the temperature of the fuel 34 is decreased.

The fuel supply system 18 also includes an intermediate pressure fuel gas compressor recirculation conduit 298. In the illustrated embodiment, the recirculation conduit 298 passes from the outlet 290 of the high pressure fuel gas compressor 102 to an inlet 300 of the intermediate pressure fuel gas compressor 200. As similarly described above, the recirculation conduit 298 includes a bypass valve 302. The bypass valve 302 is configured to open when a pressure of the fuel 34 exiting the high pressure fuel gas compressor 102 exceeds a threshold. In this manner, the recirculation conduit 298, like the recirculation conduit 288, may also serve an anti-surge function by regulating the pressure of the fuel 34 passing to the combustor 24 from the high pressure fuel gas compressor 102.

Additionally, the fuel supply system 18 includes a low pressure fuel gas compressor recirculation conduit 304, which passes from an outlet 306 of the low pressure fuel gas compressor 104 to an inlet 308 of the low pressure fuel gas compressor 104. In the illustrated embodiment, the recirculation conduit 304 includes a bypass valve 310 configured to open when a pressure of the fuel 34 exiting the low pressure fuel gas compressor 104 exceeds a threshold. As will be appreciated, the recirculation conduit 304 may not include a cooler (e.g., the cooler 280), because the third conduit 278 extending between the low pressure fuel gas compressor 104 and the intermediate pressure fuel gas compressor 200 includes the cooler 280, and the fuel 34 may pass through the cooler 280, thereby cooling the fuel 34, before the fuel 34 passes through the recirculation conduit 304. However, in other embodiments, a cooler (e.g., cooler 280) may be disposed along the recirculation conduit 304 instead of, or in addition to, being disposed along the third conduit 278.

Figure 6:
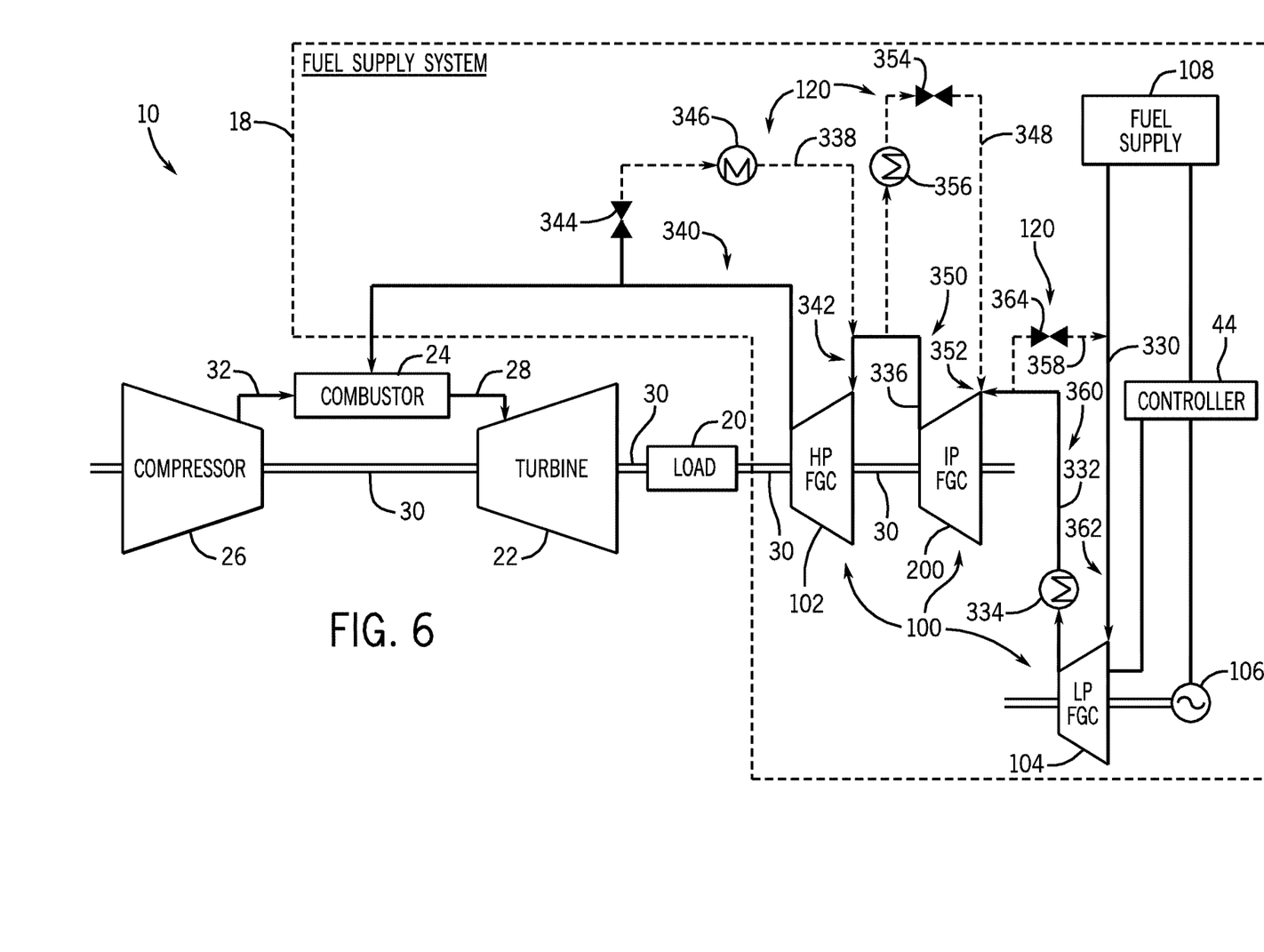
FIG. 6 is a schematic of an embodiment of the gas turbine system and the fuel supply system.

FIG. 6 is a partial schematic of an embodiment of the combined cycle power generation system 10, illustrating the fuel supply system 18 having three fuel gas compressors 100. In other words, the fuel supply system 18 is a three-stage system. The illustrated embodiment of the fuel supply system 18 is similar to the embodiment shown in FIG. 4, and includes similar elements and element numbers. However, in the illustrated embodiment, the low pressure fuel gas compressor 104 is driven by the motor 106, and the high pressure and intermediate pressure fuel gas compressors 102 and 200 are driven by the shaft 30 of the gas turbine system 12.

As mentioned above, the fuel 34 is supplied to the combustor 24 at an elevated pressure. When the gas turbine system 12 is powered off or starting up, the motor 106 may be used to operate (e.g., rotate) the low pressure fuel gas compressor 104. In this way, the fuel 34 may be pressurized and supplied to the combustor 24 to prepare and/or start up the gas turbine system 12 for steady state operation. In other words, the motor 106 driven compressor 100, 102, 200 is a stand-alone or dedicated compressor that does not rely on power from turbines 22, 14.

As shown, the low pressure fuel gas compressor 104 may draw the fuel 34 from the fuel supply 108. For example, in the illustrated embodiment, the fuel 34 passes to the low pressure fuel gas compressor 104 through a fuel supply inlet 330. As shown, the fuel supply inlet 330 passes from the fuel supply 108 to the low pressure fuel gas compressor 104. Prior to or during startup of the gas turbine system 12, the low pressure fuel gas compressor 104, powered by the motor 106, boosts the fuel 34 to the desired elevated pressure and sends the fuel 34 through the intermediate pressure fuel gas compressor 200 and the high pressure fuel gas compressor 102 to the combustor 24. As will be appreciated, prior to or during startup of the gas turbine system 12, the high and intermediate pressure fuel gas compressors 102 and 200 coupled to the shaft 30 may be operating at low speeds and may have limited flow and/or compression capacities, because the shaft 30 may be rotating at low speeds or not at all.

As the combustor 24 receives the pressurized fuel 34 from the low pressure fuel gas compressor 104 powered by the motor 106, the combustor 24 may begin combusting the fuel 34, and the gas turbine system 12 may begin operation. As the gas turbine system 12 operates, the turbine 22 rotates the shaft 30, thereby driving the high and intermediate pressure fuel gas compressors 102 and 200 pressurize the fuel 34 with intermediate and high pressure stages of compression. That is, the intermediate pressure fuel gas compressor 200 compresses the fuel 34 flowing from the low pressure fuel gas compressor 104 in an intermediate pressure compression stage, and the high pressure fuel gas compressor 102 compresses the fuel 34 flowing from the intermediate pressure fuel gas compressor 200 in a high pressure compression stage. More specifically, the fuel 34 flows through the fuel supply inlet 330 to the low pressure fuel gas compressor 104, where the fuel 34 is pressurized in a low pressure compression stage. From the low pressure fuel gas compressor 104, the pressurized fuel 34 passes to the intermediate pressure fuel gas compressor 200 (e.g., through a conduit 332), where the fuel 34 is further pressurized in an intermediate pressure compression stage. Additionally, as the fuel 34 passes from the low pressure fuel gas compressor 104 to the intermediate pressure fuel gas compressor 200, the fuel 34 is cooled by a cooler 334 (e.g., a low pressure cooler) disposed along the conduit 332 (e.g., between the low pressure fuel gas compressor 104 and the intermediate pressure fuel gas compressor 200). From the intermediate pressure fuel gas compressor 200, the fuel 34 passes through a conduit 336 to the high pressure fuel gas compressor 102. After the fuel 34 is further pressurized within the high pressure fuel gas compressor 102 in a high pressure compression stage, the fuel 34 is supplied to the combustor 24.

Moreover, the fuel supply system 18 also includes the recirculation conduits 120. For example, a high pressure fuel gas compressor recirculation conduit 338 passes from an outlet 340 of the high pressure fuel gas compressor 102 to an inlet 342 of the high pressure fuel gas compressor 102. The recirculation conduit 338 also includes a bypass valve 344. As will be appreciated, the bypass valve 344 may be configured to open when a pressure of the fuel 34 exiting the high pressure fuel gas compressor 102 exceeds a threshold. In this manner, the recirculation conduit 338 may serve an anti-surge function by regulating the pressure of the fuel 34 passing to the combustor 24 from the high pressure fuel gas compressor 102. Additionally, the recirculation conduit 338 includes a cooler 346 (e.g., a high pressure cooler), which may be configured to cool the fuel 34 passing through the recirculation conduit 338. As will be appreciated, the high pressure fuel gas compressor 102 may have improved operation when the temperature of the fuel 34 is decreased.

The fuel supply system 18 also includes an intermediate pressure fuel gas compressor recirculation conduit 348. In the illustrated embodiment, the recirculation conduit 348 passes from an outlet 350 of the intermediate pressure fuel gas compressor 200 to an inlet 352 of the intermediate pressure fuel gas compressor 200. As similarly described above, the recirculation conduit 348 also includes a bypass valve 354. The bypass valve 344 may be configured to open when a pressure of the fuel 34 exiting the intermediate pressure fuel gas compressor 200 exceeds a threshold. In this manner, the recirculation conduit 348 may serve an anti-surge function by regulating the pressure of the fuel 34 passing to the high pressure fuel gas compressor 102 from the intermediate pressure fuel gas compressor 200. Additionally, the recirculation conduit 348 includes a cooler 356 (e.g., an intermediate pressure cooler), which may be configured to cool the fuel 34 passing through the recirculation conduit 348. As will be appreciated, the intermediate pressure fuel gas compressor 200 may have improved operation when the temperature of the fuel 34 is decreased.

Additionally, the fuel supply system 18 includes a low pressure fuel gas compressor recirculation conduit 358, which passes from an outlet 360 of the low pressure fuel gas compressor 104 to an inlet 362 of the low pressure fuel gas compressor 104. In the illustrated embodiment, the recirculation conduit 358 includes a bypass valve 364 configured to open when a pressure of the fuel 34 exiting the low pressure fuel gas compressor 104 exceeds a threshold. The recirculation conduit 358 may not include a cooler (e.g., the cooler 334), because the conduit 332 extending between the low pressure fuel gas compressor 104 and the intermediate pressure fuel gas compressor 200 includes the cooler 334, and the fuel 34 may pass through the cooler 334, thereby cooling the fuel 34, before the fuel 34 passes through the recirculation conduit 358. However, in other embodiments, a cooler (e.g., cooler 334) may be disposed along the recirculation conduit 358 instead of, or in addition to, being disposed along the conduit 332.

As discussed in detail above, embodiments of the present disclosure are directed towards the fuel supply system 18 for the gas turbine system 12, which may be used in a power generation system, such as the combined cycle power generation system 10 or a blast furnace gas generation power plant. More specifically, the fuel supply system 18 contains the motor 106 driven fuel gas compressor 100 (e.g., the high, intermediate, and/or low pressure fuel gas compressors 102, 200, and 104) and the main shaft 30 driven fuel gas compressor 100 (e.g., the high, intermediate, and/or low pressure fuel gas compressors 102, 200, and 104), where the motor 106 driven fuel gas compressor 100 and the main shaft 30 driven fuel gas compressor 100 are serially connected (e.g., in fluid communication with one another). In other words, the fuel supply system 18 includes a first fuel gas compressor 100 (e.g., the high, intermediate, and/or low pressure fuel gas compressors 102, 200, and 104) that is driven by the motor 106, which is serially connected to a second fuel gas compressor 100 (e.g., the high, intermediate, and/or low pressure fuel gas compressors 102, 200, and 104) that is driven by the main shaft 30 of the gas turbine system 12 (e.g., the shaft driven by a turbine of the gas turbine system). As discussed above, the motor 106 is a stand-alone motor that is separate from and not driven by the turbines 14, 22. The main shaft 30 driven fuel gas compressor 100 and the motor 106 driven fuel gas compressor 100 are each configured to compress the fuel 34, such as blast furnace gas, to be supplied to the combustor 24 of the gas turbine system 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a fuel supply system, comprising:
     a fuel supply;
     a first fuel gas compressor drivable by a motor;
     a second fuel gas compressor drivable by a shaft of a gas turbine system;
     a first conduit extending from the fuel supply to the first fuel gas compressor, wherein the first conduit is configured to route a fuel gas from the fuel supply to the first fuel gas compressor;
     a check valve disposed in the first conduit upstream of an inlet of the first fuel gas compressor, wherein the check valve is configured to close when a discharge pressure of the second fuel gas compressor exceeds a threshold during a period when the gas turbine system is starting up and transitioning toward a steady state operation;
     a second conduit configured to route the fuel gas from the fuel supply to the second fuel gas compressor;
     a third conduit configured to route the fuel gas from the second fuel gas compressor to the first fuel gas compressor; and
     a recirculation circuit configured to recirculate the fuel gas output by the second fuel gas compressor to the second conduit into the second fuel gas compressor, wherein the recirculation circuit comprises a bypass valve;
     wherein the first fuel gas compressor and the second fuel gas compressor are configured to pressurize the fuel gas and to supply a pressurized fuel gas flow to a combustor of the gas turbine system, and the first fuel gas compressor and the second fuel gas compressor are fluidly coupled to one another in a series arrangement.

2. The system of claim 1, wherein the first fuel gas compressor is a high pressure fuel gas compressor and the second fuel gas compressor is a low pressure fuel gas compressor.

3. The system of claim 1, comprising the motor, wherein the motor is an electric motor.

4. The system of claim 1, wherein the fuel supply system further comprises an other recirculation conduit configured to recirculate the fuel gas output by the first fuel gas compressor to the third conduit into the first fuel gas compressor to regulate a pressure of the pressurized fuel gas flow exiting the first fuel gas compressor.

5. The system of claim 4, wherein the other recirculation conduit further comprises an other bypass valve configured to open when the pressure of the pressurized fuel gas flow exiting the first fuel gas compressor exceeds a threshold.

6. The system of claim 4, wherein the other recirculation conduit further comprises a cooler configured to cool the pressurized fuel gas flow passing through the other recirculation conduit.

7. The system of claim 1, wherein the check valve is configured to control a distribution of the fuel gas between the first and second fuel gas compressors when a parameter of the gas turbine system exceeds the threshold during the period when the gas turbine system is starting up and transitioning toward the steady state operation.

8. A system, comprising:
an electric motor;
a first compressor drivable by the electric motor;
a second compressor drivable by a gas turbine system, wherein the first and second compressors are disposed in a series arrangement;
a valve configured to control a distribution of first and second portions of a fuel gas to the first compressor and the second compressor, respectively;
an electronic control unit configured to control a multi-stage compression of the fuel gas for the gas turbine system, wherein the electronic control unit is configured to control the valve to change the distribution of the first and second portions of the fuel gas when a parameter of the gas turbine system meets at least one threshold value during a period when the gas turbine system is starting up and transitioning toward a steady state operation, and the electronic control unit is configured to control operation of the electric motor to cause the electric motor to drive the first compressor during the period when the second compressor has a limited or no compression capacity;
a recirculation circuit extending from an inlet of the second compressor to an outlet of the second compressor, wherein the recirculation circuit comprises a bypass valve configured to regulate a pressure of the fuel gas exiting the second compressor;
wherein the first fuel gas compressor and the second fuel gas compressor are configured to pressure the fuel gas and to supply a pressurized fuel gas flow to a combustor of the gas turbine system.

9. The system of claim 8, wherein the electronic control unit is configured to control the first compressor driven by the electric motor to compress the fuel gas upstream or downstream from the second compressor driven by the gas turbine system.

10. The system of claim 8, comprising the gas turbine system having a shaft coupling the second compressor with a turbine.

11. The system of claim 8, comprising:
an other recirculation circuit extending from an inlet of the first compressor to an outlet of the first compressor; wherein the other recirculation circuit comprises an other bypass valve configured to regulate a pressure of the fuel gas exiting the first compressor.

12. A method, comprising:
pressurizing a fuel flow of a fuel gas with a first fuel gas compressor driven by a motor;
recirculating the fuel flow through a first recirculation circuit that extends from a first output of the first fuel gas compressor to a first input of the first fuel gas compressor, wherein the first recirculation circuit comprises a first bypass valve configured to open when a first pressure of the fuel gas exiting the first fuel gas compressor exceeds a first threshold;
pressurizing the fuel flow of the fuel gas with a second fuel gas compressor driven by a shaft of a gas turbine system, wherein the first and second compressors are disposed in a series arrangement: and
controlling, via a valve, a distribution of first and second portions of the fuel gas to the first fuel gas compressor and the second fuel gas compressor, respectively, wherein the controlling further comprises changing the distribution of the first and second portions of the fuel gas when a parameter of the gas turbine system meets at least one threshold value during a period when the gas turbine system is starting up and transitioning toward a steady state operation; and
supplying the fuel flow of the fuel gas from the first fuel gas compressor to a combustor of the gas turbine system.

13. The method of claim 12, comprising routing the fuel flow of the fuel gas from an output of the second fuel gas compressor to the input of the first fuel gas compressor.

14. The method of claim 12, comprising:
supplying the fuel flow of the fuel gas to the first fuel gas compressor through a first conduit extending from a fuel supply to the first fuel gas compressor; and
supplying the fuel flow of the fuel gas to the first fuel gas compressor through a second conduit extending from an output of the second fuel gas compressor to the first fuel gas compressor.

15. The method of claim 14, wherein the valve comprises a check valve disposed in the first conduit upstream of the input of the first fuel gas compressor, and wherein the at least one parameter comprises a discharge pressure of the second fuel gas compressor.

16. The method of claim 12, comprising;
recirculating the fuel flow of the fuel gas through a second recirculation circuit that extends from a second output of the second fuel gas compressor to a second input of the second fuel gas compressor, wherein the second recirculation circuit comprises a second bypass valve configured to open when a second pressure of the fuel gas exiting the second fuel gas compressor exceeds a second threshold.

* * * * *